July 27, 1943.  E. T. DAVIS  2,325,232
CONTROL SYSTEM
Filed Nov. 7, 1941  4 Sheets-Sheet 1
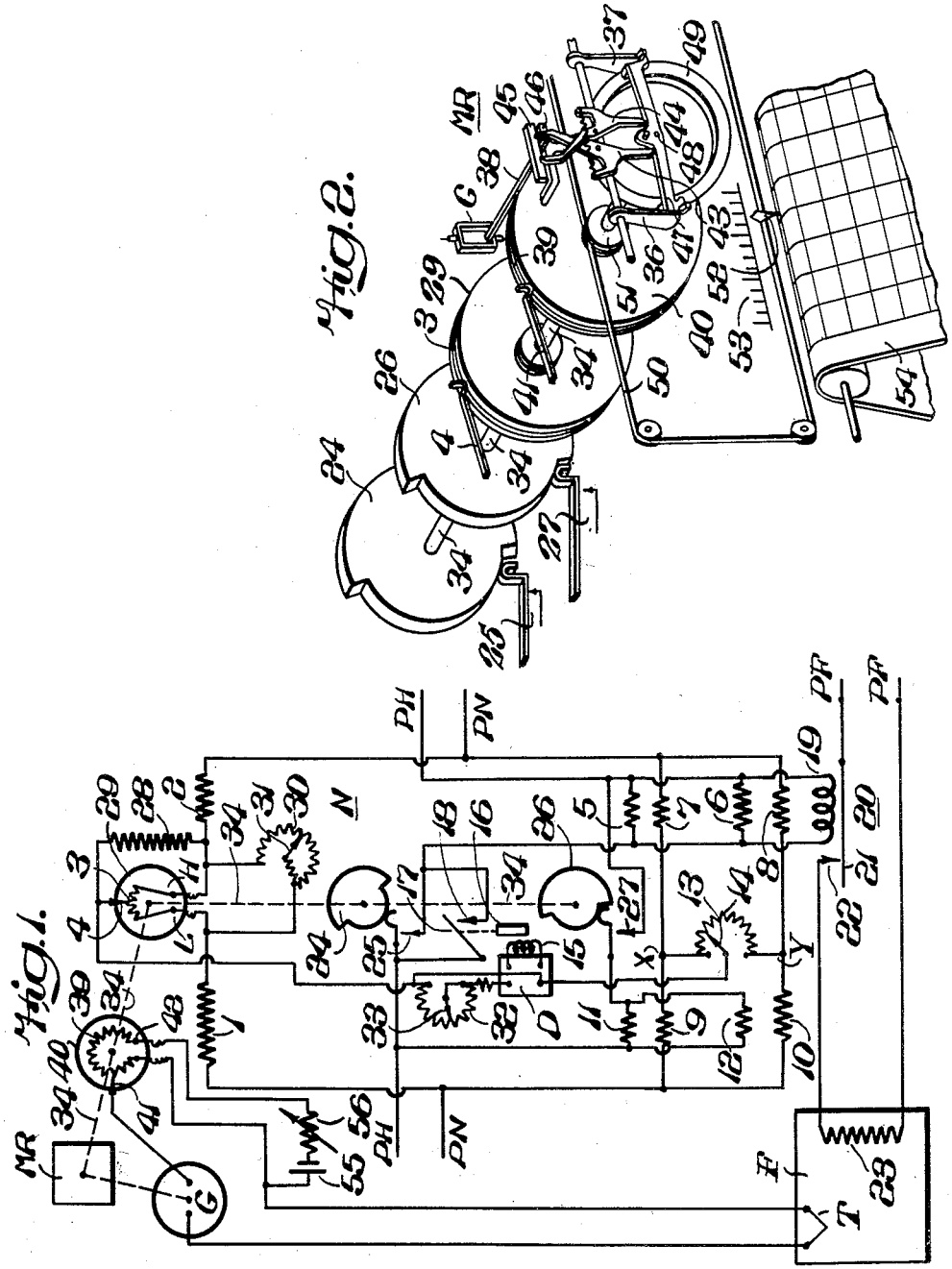
INVENTOR.
ELWOOD T. DAVIS
ATTORNEY.

July 27, 1943.  E. T. DAVIS  2,325,232
CONTROL SYSTEM
Filed Nov. 7, 1941     4 Sheets-Sheet 2
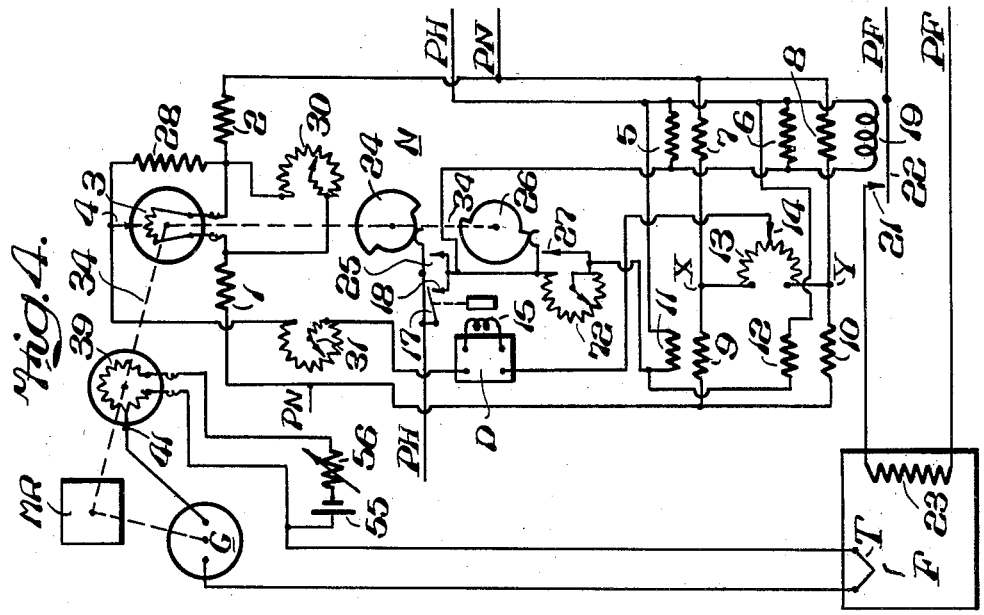
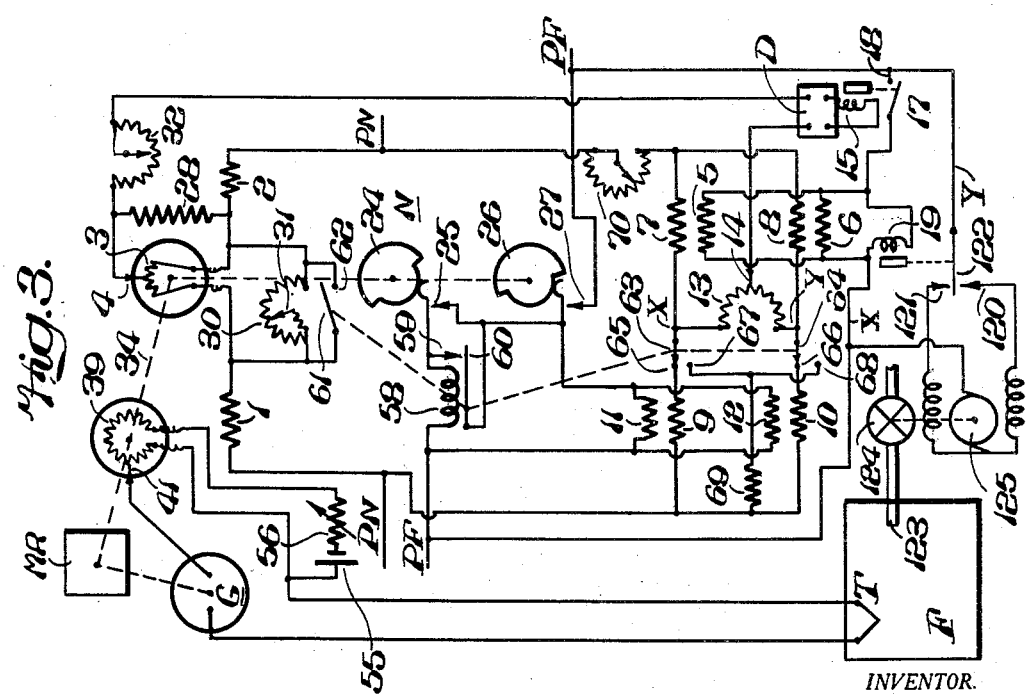
INVENTOR.
ELWOOD T. DAVIS
ATTORNEY.

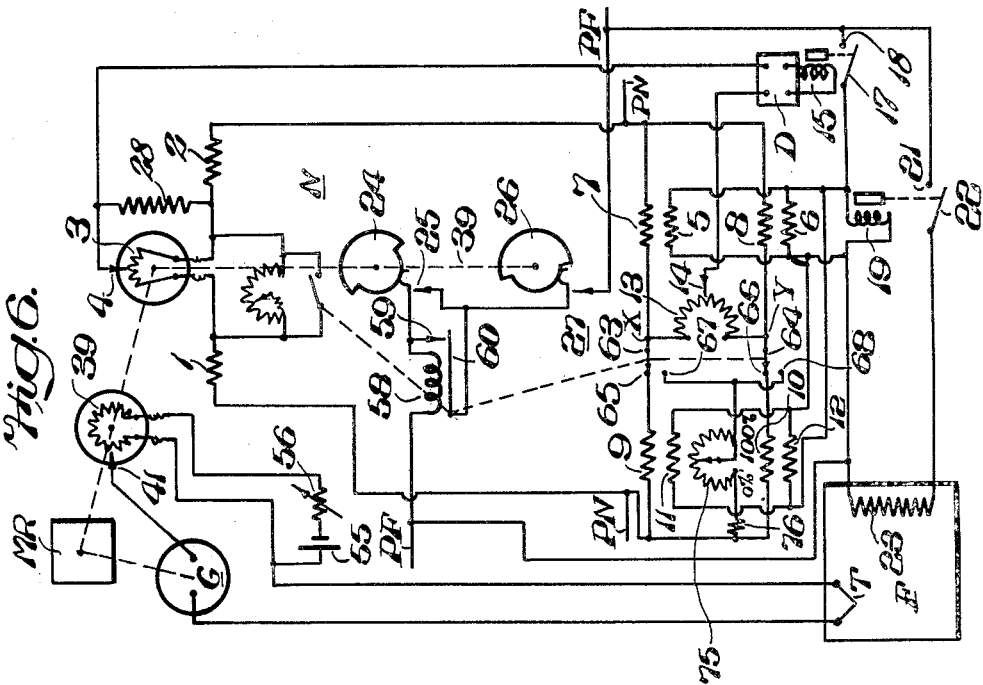
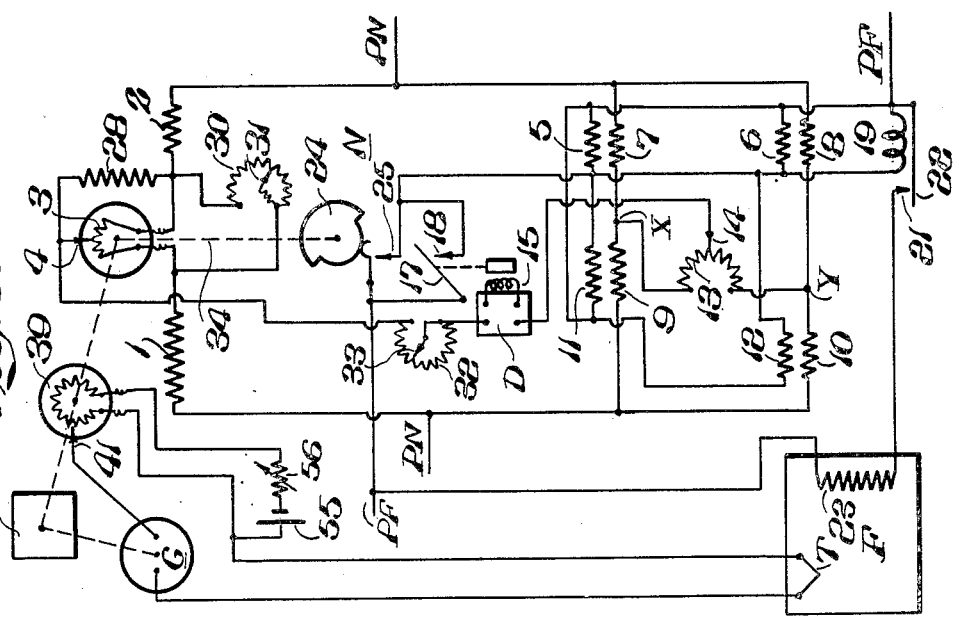

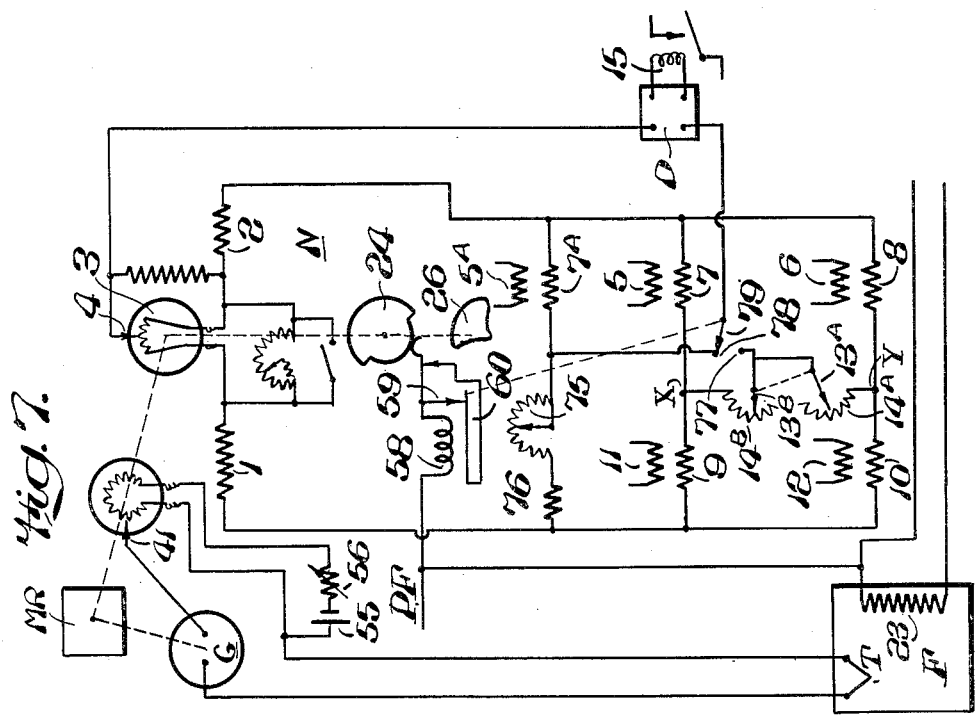

Patented July 27, 1943

2,325,232

UNITED STATES PATENT OFFICE 2,325,232

CONTROL SYSTEM

Elwood T. Davis, Brookline, Pa., assignor to Leeds & Northrup Company, Philadelphia, Pa., a corporation of Pennsylvania Application November 7, 1941, Serial No. 418,117

14 Claims. (Cl. 171—229)

My invention relates to systems for varying the application of an agent to control the magnitude of a condition, such as temperature, pressure, ion-concentration, or other physical, chemical, electrical or other condition, and relates particularly to systems producing both a control effect in response to changes in magnitude of a condition and a control action for correcting droop of the load/magnitude characteristic.

In accordance with my invention, the operation of a control member, such as a valve, a switch or a rheostat, regulating the application of an agent, such as electricity, heat, or a chemical, affecting the magnitude of a condition, is controlled in response to unbalance of an electrical network including, in each of different branches thereof, resistors, each having a substantial temperature coefficient of resistance, comprised with electrical heating elements therefor in assemblies having different thermal characteristics to provide, by adjustment of a potential-dividing resistance connected between aforesaid branches of the network, for selection, between limits predetermined by said resistors, of any desired rate of droop correction.

Further in accordance with some forms of my invention, to afford control of the maximum rate of application of the agent when the magnitude of said condition is well outside of a relatively narrow range including the desired magnitude of said condition, the resistors affording droop-correction control are temporarily replaced in the network by a resistor having no heating element thermally to vary its effective magnitude of resistance and of selected or adjustably fixed magnitude of resistance.

My invention further resides in networks and control systems having the features of combination and arrangement hereinafter described and claimed.

For an understanding of my invention, reference is made to the accompanying drawings in which:

Fig. 1 diagrammatically illustrates one modification of my control system;

Fig. 2, in perspective, discloses significant elements of Figs. 1 and 3 to 7 and of a mechanical relay mechanism suited to effect their adjustment;

Figs. 3 to 7 diagrammatically illustrate various modifications of the system of Fig. 1.

Referring to Fig. 1, similar to Fig. 6 of my application Serial No. 338,466 but modified in accordance with my present invention, the resistances 1, 2 and slidewire 3 comprise two arms of a balanceable bridge network N the ratio of whose impedances depends upon the setting of contact 4 with respect to slidewire 3.

The contact 4 and slidewire 3 are adjusted relatively to each other in accordance with the changes in magnitude of a condition, which for purposes of explanation, is, in the system of Fig. 1, the temperature of furnace F. Otherwise stated, the potential of the contact or point 4 in the branch 1, 2, 3 of the network varies as a function of the temperature.

Assuming the network previously to have been balanced, movement of slidewire 3 with respect to its contact 4 produces an unbalance of the network detected, under circumstances hereinafter discussed, by any suitable responsive device D comprising for example a thermionic amplifier including in its output circuit a relay 15 whose suitably biased armature 16 actuates movable contact 17 toward and from engagement with fixed contact 18 upon energization and de-energization respectively of relay coil 15.

Closure of contacts 17 and 18 completes a circuit, external to network N, of the heating coils 5 and 6 respectively intimately thermally associated with resistors 7 and 8 of nickel or other suitable conductor having substantial co-efficient of resistance. The heating coil 5 may be wound on the same form as resistor 7 and the assembly so produced is preferably of small mass, low thermal inertia, to ensure rapid increase and decrease in resistance of resistor 7 upon energization and deenergization respectively of heater 5; heating coil 6 and resistor 8 also comprise an assembly of low heat lag substantially equal to that of assembly 5, 7. These assemblies for convenience are hereinafter termed "proportional action thermal converter assemblies."

When the network N is unbalanced in sense causing closure of contacts 17, 18, the resulting energization of the heaters causes the resistors 7 and 8 to increase in resistance; conversely when the heaters are de-energized the effective resistance of each of these resistors decreases.

The resistances 9 and 10, in series respectively with aforesaid resistances 7 and 8, are also of nickel or other material having a substantial temperature coefficient of resistance and are wound upon the same forms as, or otherwise intimately thermally associated with, the heater windings 11 and 12 respectively. For convenience of explanation, these assemblies are hereinafter termed "droop-corrector thermal converter assemblies."

The two droop-corrector assemblies are of substantially different thermal inertia; for example, the mass of resistor 9 and the associated components may be small to ensure relatively rapid increase and decrease in magnitude of the electrical resistance of resistor 9 upon energization and de-energization of heater 11 whereas the mass of resistor 10 and its associated components may be relatively large to provide relatively slow increase and decrease in magnitude of the electrical resistance of resistor 10 upon energization and de-energization of heater 12. Preferably assembly 9, 11 has a thermal inertia only slightly greater than that of assembly 5, 7 while assembly 10, 12 has a thermal inertia substantially greater than that of assembly 6, 8.

Accordingly when heaters 11 and 12 are concurrently energized, the resistances of resistors 9 and 10 increase but at significantly different rates; more particularly, the resistance of resistor 9 increases more rapidly than the resistance of resistor 10. Conversely, when the heaters 11 and 12 are simultaneously de-energized, the resistance of resistor 9 decreases more rapidly than the resistance of resistor 10 decreases.

In effect, the resistances 7 and 9 comprise two arms of a Wheatstone bridge whose other two arms comprise resistances 1, 2 and slidewire 3. In this bridge, the potential of point X in the branch comprising resistors 7 and 9 is not fixed but varies in magnitude and at a rate dependent upon the effective magnitudes of resistors 7 and 9 as influenced by the heaters 5, 11 and by the thermal lag of the assemblies 9, 11 and 5, 7.

Likewise, the resistances 8 and 10 comprise in effect two arms of another and independently balanceable Wheatstone bridge whose other arms comprise resistance 1, 2 and slidewire 3. In this second bridge, the potential of point Y in the branch comprising resistors 8 and 10 is not fixed but varies in magnitude and at a rate dependent upon the effective magnitudes of resistors 8 and 10 as influenced by heaters 6, 12 and by the thermal lag of the assemblies 10, 12 and 6, 8.

Inasmuch as the thermal lag of the droop corrector assembly 10, 12 is substantially greater than the thermal lag of droop corrector assembly 9, 11 the two bridges do not approach rebalance at equal rates when the heaters 5, 6 are concurrently energized nor are they further unbalanced for droop-correction action at equal rates when heaters 11, 12 are concurrently energized; the bridge including resistors 7 and 9 as one pair of arms approaches rebalance, and is further unbalanced, at rate substantially higher than the bridge including resistors 8 and 10 as one pair of arms.

By connecting slidewire 14 between points X and Y, any intermediate rate of droop-correction may be selected by adjustment of contact 13 to corresponding position. When contact 14 is in its upper limiting position to procure maximum rate of droop correction, its potential corresponds with and follows that of point X without substantial effect thereon of the variations in effective magnitude of resistors 8 and 10; conversely when contact 14 is in its lower limiting position to procure minimum rate of droop correction, its potential corresponds with and follows that of point Y without substantial effect thereon of the variations in resistance of resistors 7 and 9.

By this modification of the control system shown in Fig. 6 of my aforesaid application, it may rapidly and conveniently be adapted to suit the load requirements or operating conditions of any particular installation.

By way of example, the nominal or cold resistance of each of resistors 7, 8, 9 and 10 may be 50 ohms; the resistance of slidewire 14 may be 200 ohms.

As applied in Fig. 1 to control of an electric furnace, the closure of contacts 17, 18 in addition to effecting energization of the heating coils 5 and 6 of the proportional action assemblies also effects energization of the coil 19 of the input control relay 20 whose biased armature actuates or comprises contact 21 movable into and out of contact with contact 22 to complete a circuit including the main or auxiliary resistor 23 of furnace F.

The cam 24 adjustable in unison with the movable element of the slidewire 3 coacts with switch 25 to maintain the relay 19 energized regardless of the state of balance of network N until the furnace, after reception of a fresh charge, has been heated to a temperature not far below the desired temperature, for example the temperature corresponding with the lower temperature limit of slidewire 3; for higher temperatures the network N assumes control of energization of relay 19.

The cam 26 adjustable in unison with cam 24 and slidewire 3 coacts with switch 27 to close the circuit of heaters 11 and 12 when the furnace temperature rises to the desired magnitude thereof, for brevity termed the control point, and interrupts that circuit when the furnace temperature subsequently falls to the control point.

The heaters 5, 6, 11, 12, network N and the furnace resistor 23 may be supplied from different sources PH, PN and PF of alternating or direct current, or, by use of suitable transformers, from the same source of alternating current PF.

Resistance 28 of suitable magnitude, for example 500 ohms, maintains continuity of the branch circuit including relay D for those positions of disk 29 for which the slidewire 3 is out of engagement with its contact 4.

The slidewire 30 in shunt to slidewire 3 is provided with contact 31 manually adjustable to vary the throttling range of the control system; its setting determines the extent to which the bridge is unbalanced for any given adjustment of slidewire 3, other conditions being the same.

The slidewire 32 in shunt to the detector D permits, by manual adjustment of contact 33, variation of the effective sensitivity of the detector; with reduced sensitivity, the network N must be to greater extent unbalanced in one direction before the switch 17, 18 is closed to energize the heaters 5, 6 and relay 19; and when to greater extent unbalanced in the other direction, the current in detector coil 15 will fall to magnitude insufficient to hold contacts 17, 18 closed and thus, later than with higher sensitivity, effect de-energization of the heaters 5, 6 and relay 19. Thus decrease in sensitivity increases the period, for a given unbalance of the network N, for which the resistors 7, 8 of the proportional action assemblies are subjected to the resistance-increasing effect of heaters 5 and 6. For brevity, the adjustment afforded by slidewire 32 is termed the "impulse rate adjustment."

Preferably, the positioning of slide 3 and cams 24 and 26 in accordance with the existing magnitude of the temperature, which term herein generically covers any other condition to be measured or controlled, is effected by a mechanical relay mechanism MR, Fig. 2, of the type disclosed in U. S. Letters Patent 1,935,732 to Squibb. The cams 24, 26 and the supporting disk 29 of slidewire 3 of network N are mounted upon shaft 34 angularly adjusted in each cycle of the mechanism by one or the other of the continuously rotating cams 36, 37 in accordance with the deflection from neutral of the pointer 38 of the galvanometer G.

The galvanometer coil G is connected in a circuit including the thermo-couple T, disposed for response to the furnace temperature, and the potentiometer slidewire 39 supported by disk 40 on aforesaid shaft 34 of the mechanical relay mechanism MR.

Battery 55, or equivalent, supplies the potentiometer slidewire current; rheostat 56 provides for adjustment thereof to that standard value for which the slidewire scale, or equivalent, was calibrated.

When the thermo-couple voltage is not balanced by the effective voltage of the slidewire 39 (the voltage measured from contact 41 of the slidewire to the terminal 42), the galvanometer deflects from neutral position whereupon, during a cycle of mechanism MR, one or the other of the feelers 43, 44, during their movement toward engagement with the displaced pointer 38, then held by clamps 45, 46, rocks the driving clutch member 47 about pivot 48 from its neutral position, Fig. 2, through an angle proportional to the galvanometer's deflection. Later in the cycle, member 47 in displaced position is brought into engagement with driven clutch member 49 secured to shaft 34 so that when returned to neutral position by one or the other of cams 36, 37, there is effected a rebalancing adjustment of slidewire 39 with respect to its contact 41. Thus by one or more steps, slidewire 39 is adjusted until its effective voltage balances the thermo-couple voltage; at balance, the pointer 38 is in neutral position and no adjustment of shaft 34 is effected.

The aforesaid adjustment of slidewire 39 to effect balance of the measuring circuit is accompanied by concurrent adjustment of cams 24, 26 and slidewire 3, each to position corresponding with the existing magnitude of the furnace temperature; shaft 34 may also be coupled, as by cord 50 and pulley 51, to the pen or stylus 52 coacting with scale 53, a moving recorder sheet or chart 54, or with both the scale and chart thus to indicate or record the furnace temperature as controlled by network N.

Fig. 3 is illustrative of a modification, in accordance with my present invention, of the arrangement disclosed in Fig. 7 of my aforesaid application Serial No. 338,466. Compared with Fig. 1 hereof, the arrangement shown in Fig. 3 has the additional feature of permitting adjustment of the maximum heat-input rate while the furnace temperature is rising to the control point, as well as thereafter.

In this, as in any of the other modifications, the heater 23 may be replaced by a burner 123 having a valve 124 adjustable by motor 125 alternately operating in opposite directions under control of the contacts 120, 121, 122 of relay 19.

In Fig. 3, the heating coils 5, 6 and relay 19 are subject to control only by relay 15 (not by cam 24 as well) and for control of heaters 11 and 12 there is provided the additional relay 58 in series with cam-controlled switches 25 and 27.

When relay 58 is energized, its contacts 61 and 62 are closed to shunt or short-circuit the slidewire 3, its contacts 59 and 60 are closed to provide a lock-in path, in shunt to switch 25, to maintain the relay energized until switch 27 is opened, and its contacts 63 and 64 have been moved from engagement with fixed contacts 65, 66 into engagement with fixed contacts 67, 68 to exclude from network N the resistors 9 and 10 of the droop-corrector assemblies and to substitute therefor the resistor 69, of nickel or equivalent, with cold resistance substantially equal to the sum of the maximum resistance of the rate setting rheostat 70 and the equivalent cold resistance of resistors 9 and 10 in parallel. With relay 58 deenergized, the slidewire 3 is unshunted by contacts 61, 62, contacts 59, 60 are out of engagement with each other, and contacts 63, 64 are in the position shown in Fig. 3 to include the droop-corrector resistors 9, 10, in network N.

For all temperatures of furnace F below the magnitude corresponding with the "low temperature" end of slidewire 3, the relay 58 is energized. Under these conditions, the percentage of maximum input to the furnace is determined by the setting of rheostat 70; if for example, rheostat 70 is set at mid-position under the conditions assumed, relay 19, under control of detector D, is energized half of the time and closed half of the time because the successive balancing and unbalancing periods of the network N are equal in duration. When the furnace temperature has risen to the control point, relay 58 is de-energized by opening of the cam-controlled switch 27 and the subsequent control action is as described in connection with Fig. 1. The de-energization of the relay 58 also connects the resistances 9 and 10 in network N to afford automatic droop correction as described in connection with Fig. 1 modified however in that the maximum input, averaged over a period of time, is limited by the setting of rheostat 70.

Except for differences specifically discussed, the arrangements disclosed in Figs. 4 and 5 are also each generally similar to Fig. 1; elements having the same function in the different figures are identified by the same reference characters.

Referring to Figs. 4 and 5, it is assumed the temperature has just fallen from the control point. The displacement of slidewire 3 from the control point in response to the fall unbalances the network N causing relay 15 by closure of its contacts 17, 18 to cause energization of the furnace relay 19 and of the heating coils 5 and 6 of the proportional action thermal converter assemblies.

As in the other arrangements, these assemblies and the droop-corrector assemblies are so constructed that a given heat input produces or would produce the same ultimate temperature rise and the same ultimate resistance of the resistors of the pair 7, 9, and of the pair 8, 10 but are of different thermal inertias so to provide, by manual adjustment of contact 14, for selection of a desired rate of droop-correction.

With contacts 17 and 18 of relay 15 remaining closed, when the temperature differentials between resistors 7 and 9 and between 8 and 10 has attained such values the potential of contact 14 is substantially the same as that of contact 4 for displaced position of slidewire 3, relay 15 responds by de-energization, to open its contacts 17, 18 whereupon all four assemblies begin to cool but at different rates, at least as between the pair of droop-corrector assemblies, and as between them and the proportional action assemblies which may cool at the same or different rates. When, because of resulting change in the effective magnitudes of resistance of resistors 7, 8, 9, 10, the network N is again sufficiently unbalanced, relay 15 again effects reclosure of its contacts to re-energize the heating coils 5, 6, 11 and 12 and the furnace relay 19. The repeated unbalancing of the network in opposite directions and the intermittent supply, or variation in supply, of current to the furnace all proceed until slidewire 3 is returned to the control point in response to rise of the furnace temperature to the desired magnitude.

Because of aforesaid difference in the thermal characteristics of the assemblies, the heating effects produced by heaters 11, 12 upon the droop-correction resistors 9, 10 must, assuming the temperature is below the control point, be greater in each succeeding period of energization or impulse than in the one preceding it, in order to produce those temperature differences between coils 7, 9 and between 8, 10 required to balance the network for a given displacement of the slidewire 3 from the control point; conversely when the temperature is above the control point, the heating effects produced by coils 11, 12 upon the droop-correction resistors 9, 10 are and need be less and less in each succeeding impulse to produce those temperature differences between resistors 7, 9 and between resistors 8, 10 required to rebalance the network.

With the temperature at the control point, the average power input to the furnace will remain at the same level it happens to be when the furnace temperature arrives at the control point since at that time the heating effects are such that the network N is in balance.

The range of the rate of drop-corrector action may, in both Figs. 4 and 5, be extended by adjustment of the throttling range rheostat 30 connected in shunt to slidewire 3.

The modification of Fig. 4 has, in addition to like components of Fig. 5, a supplemental control cam 26 and switch 27 which especially suits the control system to batch type furnaces and prevents initial overshooting of the control point when the load first arrives there.

The switch 27, which when closed, shunts or short-circuits the rheostat 72, is so set with respect to its operating cam 26 on shaft 34 that it remains open until the temperature in rising almost, but not quite, reaches the desired temperature. With switch 27 open, the rheostat 72 is effectively in series with heating coils 11 and 12 and so reduces the rate of heating of the droop-correction resistors 9 and 10. Consequently, after a charge is placed in the furnace, its temperature is increased at maximum rate by continuous energization of the main or control heater 23 until switch 25 is opened by the control disc or cam 24. The relay 15, detector D, then assumes control of energization of the heating coils 5, 6, 11, 12 and of the furnace resistor. The control system tends to establish a temperature higher than the setting of switch 27 and so there is avoided, as desired, initial overshooting of the control point. With switch 27 closed, the rheostat 72 is effectively out of circuit with the heating coils 11 and 12; the rate of heating of the droop-correction resistors 9 and 10 is therefore increased. Further control action for maintenance of the furnace temperature at desired magnitude despite variations in heat demand of the load, in ambient conditions, line voltage and other variables, is the same as herein described in connection with the other modifications.

Except for differences here discussed, the arrangement shown in Fig. 6 is similar to that of Fig. 3. The cams 24 and 26 are so positioned on shaft 34 that switch 25 is closed for all temperatures below the temperature corresponding with the "low" temperature end of slidewire 3 and switch 27 is closed for all temperatures below the desired temperature or control point. All of the heating coils 5, 6, 11 and 12 of the two pairs of control assemblies are concurrently energized and concurrently de-energized under control of detector or relay D.

In this modification, the fixed resistance 69 of Fig. 3 is replaced by rheostat 75 and fixed resistance 76 in series therewith; when the nominal resistance of each of resistors 7, 8, 9 and 10 is 50 ohms, the resistor 76 may be 25 ohms and the maximum resistance of rheostat 76 may be 10 ohms. With rheostat 75 set at maximum, the temperature of the furnace, freshly charged, will, under control of the network N, be brought at maximum rate to that magnitude of temperature corresponding with the setting of cam 24; with rheostat 75 set at minimum, the furnace temperature is more slowly raised to aforesaid magnitude because of decreased ratio of the duration of the periods of energization of heater 23 to the periods of its de-energization.

As in Fig. 6 shown, heater 23 is energized and de-energized concurrently with energization and de-energization respectively of the heating windings 5, 6, 11 and 12 of the proportional action assemblies and of the droop-correction assemblies; however, during heating-up of the furnace, the droop-correction resistors 9, 10 are not included in the network N but instead are in effect replaced during that preliminary time of operatoin of the furnace by the resistance 76 and the rheostat 75 adjusted as above described to set the maximum rate of heating at the beginning of a run.

In either of the systems of Figs. 3 and 6, avoidance of switching in the bridge arms can be effected by recourse to the modification of Fig. 7 in which the droop-correction resistors 9, 10 and the rheostat 75 for selecting the maximum rate of heating at start of a run are always in network N. The contacts 77, 78 and 79 of relay 58 are in the detector or galvanometer branch of the bridge and consequently their contact resistance or variation thereof has no effect upon the balance point of the bridge.

To provide the same proportional control characteristic of Fig. 3 or 6, the rheostat 75 and resistor 76 are connected to a proportional control resistor 7A, of a proportional control thermal converter assembly having the same electrical and thermal characteristics as that comprising resistor 7; the heater 5A of this auxiliary control assembly is energized and de-energized concurrently with the heaters 5 and 6.

Therefore when contact 79 is moved from engagement with contact 77 to contact 78, or vice versa, the effect is the same as if resistors 9 and 10 had been substituted for rheostat 75 and resistor 76 or vice versa.

In any of the modifications, the slidewire 14 may be replaced, as shown in Fig. 7, by two slide-wires 14A, 14B connected respectively to points Y and X and in series with each other through their contacts or contacts 13A, 13B movable in unison. The contacts or the slidewires are of such relative angular disposition that for movements of the contacts near either limit of their range the connection between the slidewires is broken; for one limit of contact movement the detector D is connected only to the upper pair of assemblies 5, 7 and 9, 11 whereas for the other limit of movement of contacts 13A, 13B the detector D is connected only to the lower pair of assemblies 6, 8 and 10, 12. For each of the intermediate positions of the contacts 13A, 13B, the potential thereof is jointly determined by both the upper and lower pairs of assemblies, the less the resistance between the contacts and the point Y, the more nearly the potential of the contact correspond in magnitude and rate of change with the potential of point Y and conversely the less the resistance between the contacts and point X the more nearly the potential of the contact corresponds in magnitude and rate of change with the potential of point X.

Although the control systems of Figs. 1 to 7 have been described in connection with variation of the heat input to a furnace in response to, and to effect control of, the temperature of the furnace, they may be utilized, by selection of suitable condition-responsive devices and agent-controlling means, to regulate or control the magnitude of various conditions including pressure, ion-concentration, rate of flow, generally as disclosed by way of example in my aforesaid application.

What I claim is:

1. A network comprising branches connected in parallel to each other, impedances relatively adjustable in magnitude to vary the potential of a point in one of said branches, serially connected resistors in each of other of said branches, thermal elements in heat transfer relation to said resistors to vary their effective magnitudes of resistance, an impedance interconnecting said other branches at points intermediate serially connected resistors thereof, and electro-responsive means for controlling energization of said thermal elements connected between said impedance and said point of said one of said branches.

2. A network comprising adjustable means movable to vary the potential of a point in one branch of said network, means for varying at different rates the potentials of points in other branches of said network, an impedance in a path between said last-named points, and means for controlling said second-named means comprising electro-responsive means connected between said impedance and said first-named point, means effective for part of the range of movement of said adjustable means, and means selectively co-active with said last-named means and said electro-responsive means for part of the range of movement of said adjustable means.

3. A network comprising adjustable means movable to vary the potential of a point in one branch of said network, serially connected resistors in each of the other of said branches, an impedance interconnecting said other branches, means for effecting variation of the effective magnitude of resistance of at least one of said resistors in each of said branches comprising electro-responsive means connected between said impedance and said point, and means for effecting variation of the effective magnitude of resistance of at least another of said resistors in each of said branches comprising structure movable with said adjustable means.

4. A network comprising adjustable means movable to vary the potential of a point in one branch of said network, serially connected resistors in each of the other of said branches, an impedance interconnecting said other branches, means effective for part of the range of movement of said adjustable means to vary at different rates the effective magnitudes of the serially-connected resistors of each of said branches comprising electro-responsive means connected between said impedance and said point, and means effective for another part of said range of movement to vary at different rates the effective magnitudes of the serially-connected resistors of each of said branches comprising structure movable with said adjustable means.

5. A network comprising adjustable means movable to vary the potential of a point in one branch of said network, control assemblies each comprising a resistor and an electric heater therefor, droop-correction assemblies having different thermal characteristics and each comprising a resistor and an electrical heater therefor, means for connecting in each of other branches of the network the resistor of one of said control assemblies and of one of said droop-correction assemblies, an impednace connected between the resistors of said control assemblies, and means for controlling energization of said heaters comprising electro-responsive means connected between said impedance and said point.

6. A network comprising adjustable means movable to vary the potential of a point in one branch of said network, control assemblies each comprising a resistor and an electric heater therefor, droop-correction assemblies having different thermal characteristics and each comprising a resistor and an electrical heater therefor, means for connecting in each of other branches of the network the resistor of one of said control assemblies and the resistor of one of said droop-correction assemblies, an impedance connected between the resistors of said control assemblies, electro-responsive means for controlling energization of said heaters connected between said point and said impedance, and means effective for part of the range of movement of said adjustable means to substitute resistance of constant magnitude for the droop-correction resistors.

7. A control system comprising a network including three pairs of impedances, means responsive to change in magnitude of a condition for varying the relative effective magnitudes of the impedances of one of said pairs, means for controlling application of an agent affecting the magnitude of said condition, means energizable to vary at different rates the relative effective magnitudes of the impedances of each of the other pairs, a potential dividing impedance connected between said other pairs of impedances, and means for controlling energization of said second-named and said third-named means responsive to the difference of potential between a selected point of said potential dividing impedance and a point whose potential is determined by the relative magnitudes of said one of said pairs of impedances.

8. A control system comprising an electrical network, means for varying the potential of a point in one branch of said network in response to changes in magnitude of a condition, means energizable to vary the application of an agent affecting the magnitude of said condition, pairs of resistors in other branches of said network, heating means associated with said resistors to effect variation at different rates of the potentials of points one in each said other branches, a resistance connected between said last-named points and having a relatively movable contact, and means controlling energization of said heating means and of said energizable means connected between said first-named point and said contact for response to difference of the potentials thereof.

9. A control system comprising an electrical network, means for varying the potential of a point in one branch of said network in response to changes in magnitude of a condition, means for controlling the application of an agent affecting the magnitude of said condition, pairs of resistors in other branches of said network, heating means individual to each of said resistors to effect variation at different rates of the potential of points, one in each of said other branches, a voltage-dividing resistance connected between said last-named points, and means for controlling the energization of said heating means and of said agent-controlling means comprising means responsive to the difference of potential between said first-named point and a selected point of said voltage-dividing resistance.

10. A control system comprising an electrical network, means adjustable to vary the potential of a point in one branch of said network in accordance with the magnitude of a condition, means for controlling the application of an agent affecting the magnitude of said condition, means for varying at different rates the relative magnitudes of pairs of impedances in other branches of the network, a voltage dividing impedance interconnecting said other branches, means for controlling said second-named means and said agent-controlling means connected between said voltage-dividing impedance and said point, and means effective for a portion of the range of said adjustable means for effecting substitution for impedances controlled by said second-named means of impedance unaffected by said second-named means.

11. A control system comprising an electrical network, means adjustable in response to change in magnitude of a condition to vary the potential of a point in one branch of said network, means for controlling application of an agent affecting the magnitude of said condition, proportional control assemblies comprising resistors disposed respectively in other branches of said network and means for heating said resistors to vary the effective magnitude of their resistance, droop-correction assemblies comprising resistors disposed respectively in said other branches of said network and means for heating said resistors to vary the effective magnitudes of their resistance, means for determining the maximum application of said agent comprising resistance of constant magnitude disposed in another branch of said network, electro-responsive means for controlling said agent-controlling means and said heating means having one terminal connected to aforesaid point in said one branch of the network, and means operable upon movement of said adjustable means from one to another part of its range of adjustment to shift connection of the other terminal of said responsive means from said impedance to said fixed impedance.

12. A control system comprising an electrical network, adjustable means movable to vary the potential of a point in one branch of said network in response to change in magnitude of a condition, means for controlling application of an agent affecting the magnitude of said condition, control assemblies each comprising a resistor and an electric heater therefor, droop-correction assemblies having different thermal characteristics and each comprising a resistor and an electrical heater therefor, means for connecting in each of other branches of the network the resistor of one of said control assemblies and the resistor of one of said droop-correction assemblies, an impedance connected between said control assemblies, and means for controlling energization of said electric heaters and actuation of said agent-controlling means responsive to the difference of potential means between said impedance and said point.

13. A control network comprising branches connected in parallel with each other, means movable in response to change in magnitude of a condition to vary the potential of a point in one of said branches, means for controlling application of an agent affecting the magnitude of said condition, control assemblies each comprising a resistor and an electric heater therefor, droop-correction assemblies having different thermal characteristics and each comprising a resistor and an electric heater therefor, means for connecting in series with each other in each of other branches of the network the resistor of one of said control assemblies and the resistor of one of said droop-correction assemblies, a voltage-dividing resistance connected between said other branches at intermediate points thereof and having a relatively adjustable contact, and means for controlling energization of said electric heaters and actuation of said agent-controlling means comprising means responsive to the difference of potential between said point and said contact.

14. A control network comprising branches connected in parallel with each other, means movable in response to change in magnitude of a condition to vary the potential of a point in one of said branches, means for controlling application of an agent affecting the magnitude of said condition, control assemblies each comprising a resistor and an electric heater therefor, droop-correction assemblies having different thermal characteristics and each comprising a resistor and an electric heater therefor, means for connecting in series with each other in each of other branches of the network the resistor of one of said control assemblies and the resistor of one of said droop-correction assemblies, a voltage-dividing resistance connected between said other branches at intermediate points thereof and having a relatively adjustable contact, means effecting continuous energization of said heaters and actuation of said agent-controlling means to procure maximum application of said agent for part of the range of movement of said adjustable means, and means effective for another part of said range of movement for controlling energization of said heaters and actuation of said agent-controlling means comprising electro-responsive means connected between said point and said contact.

ELWOOD T. DAVIS.